United States Patent
Takagi et al.

(10) Patent No.: US 11,550,154 B2
(45) Date of Patent: Jan. 10, 2023

(54) VIRTUAL IMAGE DISPLAY DEVICE AND LIGHT-GUIDING MEMBER

(71) Applicant: SEIKO EPSON CORPORATION, Tokyo (JP)

(72) Inventors: Masayuki Takagi, Azumino (JP); Tokito Yamaguchi, Azumino (JP); Toshiaki Miyao, Chino (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 190 days.

(21) Appl. No.: 17/084,185

(22) Filed: Oct. 29, 2020

(65) Prior Publication Data
US 2021/0132392 A1    May 6, 2021

(30) Foreign Application Priority Data
Oct. 30, 2019    (JP) .............................. JP2019-197249

(51) Int. Cl.
*G02B 27/01*    (2006.01)

(52) U.S. Cl.
CPC .... *G02B 27/0172* (2013.01); *G02B 2027/013* (2013.01); *G02B 2027/0178* (2013.01)

(58) Field of Classification Search
USPC ........................................................ 359/631
See application file for complete search history.

(56) References Cited

U.S. PATENT DOCUMENTS

| 6,687,057 B1* | 2/2004 | Yamazaki | ............ | G02B 27/0172 |
| | | | | 359/630 |
| 2013/0222919 A1* | 8/2013 | Komatsu | ............ | G02B 27/0172 |
| | | | | 359/630 |
| 2017/0184855 A1 | 6/2017 | Takagi et al. | | |

FOREIGN PATENT DOCUMENTS

JP    2017-120384 A    7/2017

* cited by examiner

*Primary Examiner* — Collin X Beatty
*Assistant Examiner* — Grant A Gagnon
(74) *Attorney, Agent, or Firm* — Oliff PLC

(57) ABSTRACT

A display element, and a light-guiding member including a plurality of reflection surfaces and configured to guide image light from the display element by reflecting the image light at an inner surface, and cause the image light and external light to be visually recognized in an overlapping manner are provided, wherein at a boundary between a first reflection surface and a second reflection surface adjacent to each other included in the plurality of reflection surfaces of the light-guiding member with at least one of the first reflection surface and the second reflection surface including a curved surface, an end of the first reflection surface and an end of the second reflection surface match when projected from a specific direction.

9 Claims, 13 Drawing Sheets

VIRTUAL IMAGE DISPLAY DEVICE AND LIGHT-GUIDING MEMBER

The present application is based on, and claims priority from JP Application Serial Number 2019-197249, filed Oct. 30, 2019, the disclosure of which is hereby incorporated by reference herein in its entirety.

BACKGROUND

1. Technical Field

The present disclosure relates to a virtual image display device as a head-mounted display (HMD) or the like that provides a virtual image to a user (observer), and a light-guiding member that is applicable to the virtual image display device.

2. Related Art

For example, as a light-guiding member that is applicable to a head-mounted display (HMD), a member is known that includes a connection surface that connects reflection surfaces adjacent to each other in front of the eye of the user such that a reflection surface located on the incident side of the video light is projected than a reflection surface located on the emission side (JP-A-2017-120384).

In the structure disclosed in JP-A-2017-120384, the mold for injection molding of the light-guiding member is required to be formed as separate pieces not only for each reflection surface, but also for a connection surface that connects the reflection surfaces. In addition, in this case, part of external light and/or image light may become leaked light, ghost light and the like due to the shape of the connection surface and the like depending on the design of the light-guiding member, for example. In addition, when a hard coat layer is formed on the surface of the light-guiding member through dip treatment, coating failure may be caused by accumulation of the hard coat liquid due to the shape of the connection surface and the like.

SUMMARY

A virtual image display device according to an aspect of the present disclosure includes a display element, and a light-guiding member including a plurality of reflection surfaces and configured to guide image light from the display element by reflecting the image light at an inner surface, and cause the image light and external light to be visually recognized in an overlapping manner. The plurality of reflection surfaces of the light-guiding member includes a first reflection surface and a second reflection surface adjacent to each other, at least one of the first reflection surface and the second reflection surface including a curved surface. At a boundary between the first reflection surface and the second reflection surface, an end of the first reflection surface and an end of the second reflection surface match when projected from a specific direction.

DESCRIPTION OF EXEMPLARY EMBODIMENTS

An example of a virtual image display device including a light-guiding member of an embodiment of the present disclosure is described below. Here, a head-mounted display (HMD) is described as an example of the virtual image display device.

Figure 1:
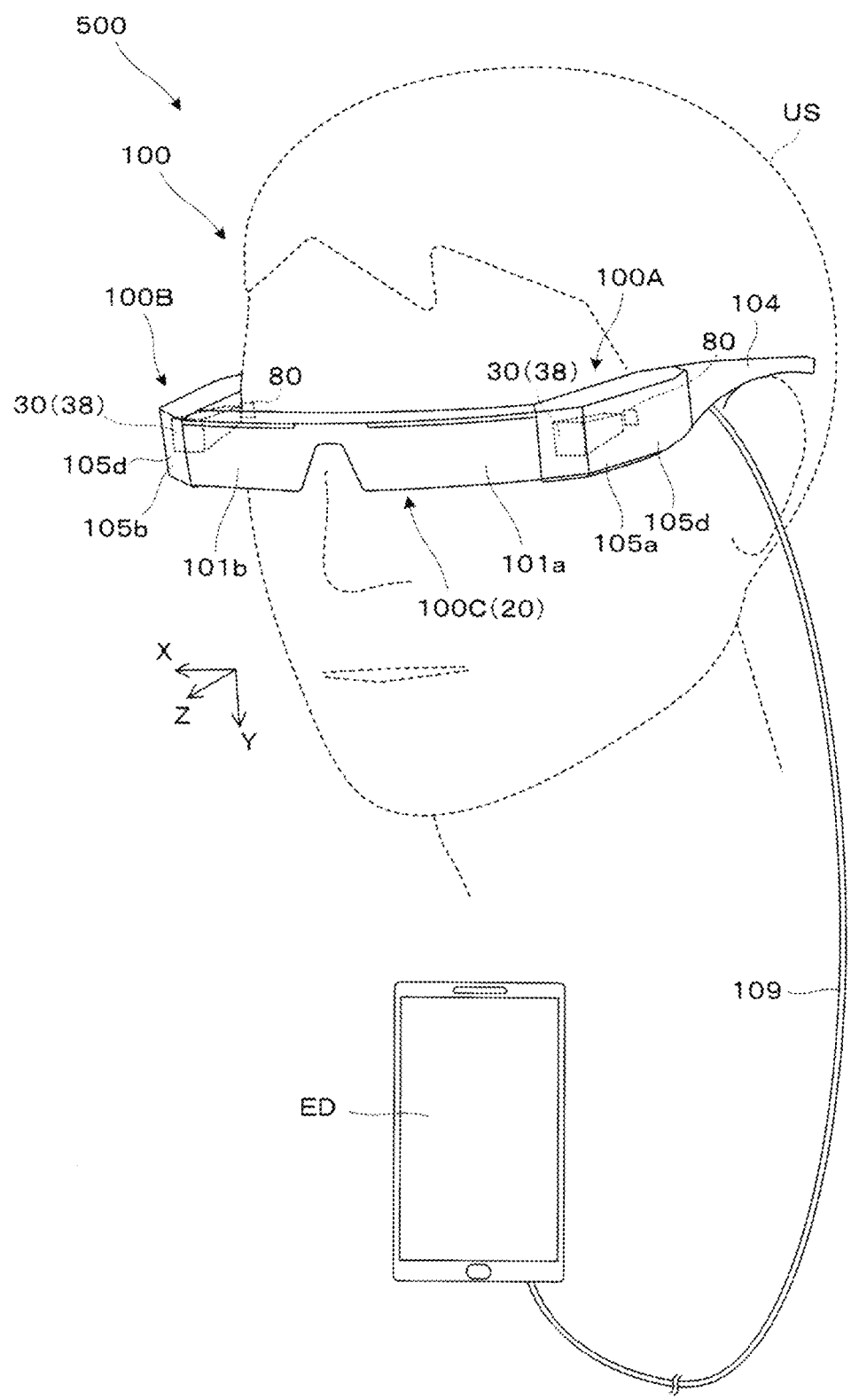
FIG. 1 is a conceptual perspective view for describing a state where an HMD as an example of a virtual image display device of an embodiment is used.

As illustrated in FIG. 1, a head-mounted display (HMD) 100 is a wearable display device having an appearance like glasses. Note that the HMD 100 is connected to an external device ED through a cable 109, and the HMD 100 and the external device ED constitute a display system 500. The external device ED is a device for performing various processes on the image to be shown in the HMD 100 and outputting a video signal and the like to the HMD 100, and can be configured by downloading a required application to a smartphone (smart phone), or the like, for example.

The HMD 100 is an optical body portion for performing image formation as a virtual image display device. For this reason, for example, the HMD 100 includes light-guiding members 10*a* and 10*b* (see FIG. 2) that guide image light as a light-guiding member according to this embodiment. In other words, the light-guiding members 10*a* and 10*b* are optical members for performing image formation in the HMD 100.

In FIG. 1 and the like, X, Y, and Z are a rectangular coordinate system, in which the +X direction corresponds to a lateral direction in which both eyes of an user US or observer US wearing the HMD 100 are aligned, the +Y direction corresponds to a downward direction orthogonal to the lateral direction in which both eyes of the user (observer) US are aligned, and the +Z direction corresponds to a forward direction or a front direction with respect to the user US. When described as directions in the HMD 100, the X, Y, and Z are as follows. The X axis corresponds to an axis along the direction in which the two light-guiding members 10*a* and 10*b* (see FIG. 2) constituting a first display device 100A and a second display device 100B are aligned. The Z axis corresponds to an axis along an emission direction of image light (video light) from the light-guiding members 10*a* and 10*b*. The Y axis corresponds to an axis orthogonal to both the X axis and the Z axis.

Note that the cable 109 that connects the HMD 100 and the external device ED can be composed of, for example, a USB-Type-C connector, and by receiving video data transmitted in an alternate mode of the USB-Type-C, a video display of a content image in the HMD 100 can be achieved based on a video signal from the external device ED composed of a smartphone or the like.

As illustrated in FIG. 1 and the like, the HMD 100 is an optical device that can achieve not only visual recognition of a virtual image, but also observation of an external image in a see-through manner for the user (observer) US using the HMD 100. As described above, the HMD 100 can be communicatively coupled to the external device ED through the cable 109, and can form a virtual image corresponding to a video signal input from the external device ED, for example. Note that, while the HMD 100 is described here as an optical device (optical unit) or a virtual image display device for visual recognition of a virtual image as described above, the entirety of a display system 500 including, in addition to the HMD 100 as the optical device, the part of the external device ED, or the part corresponding to it may be construed as a virtual image display device or an HMD.

Figure 2:
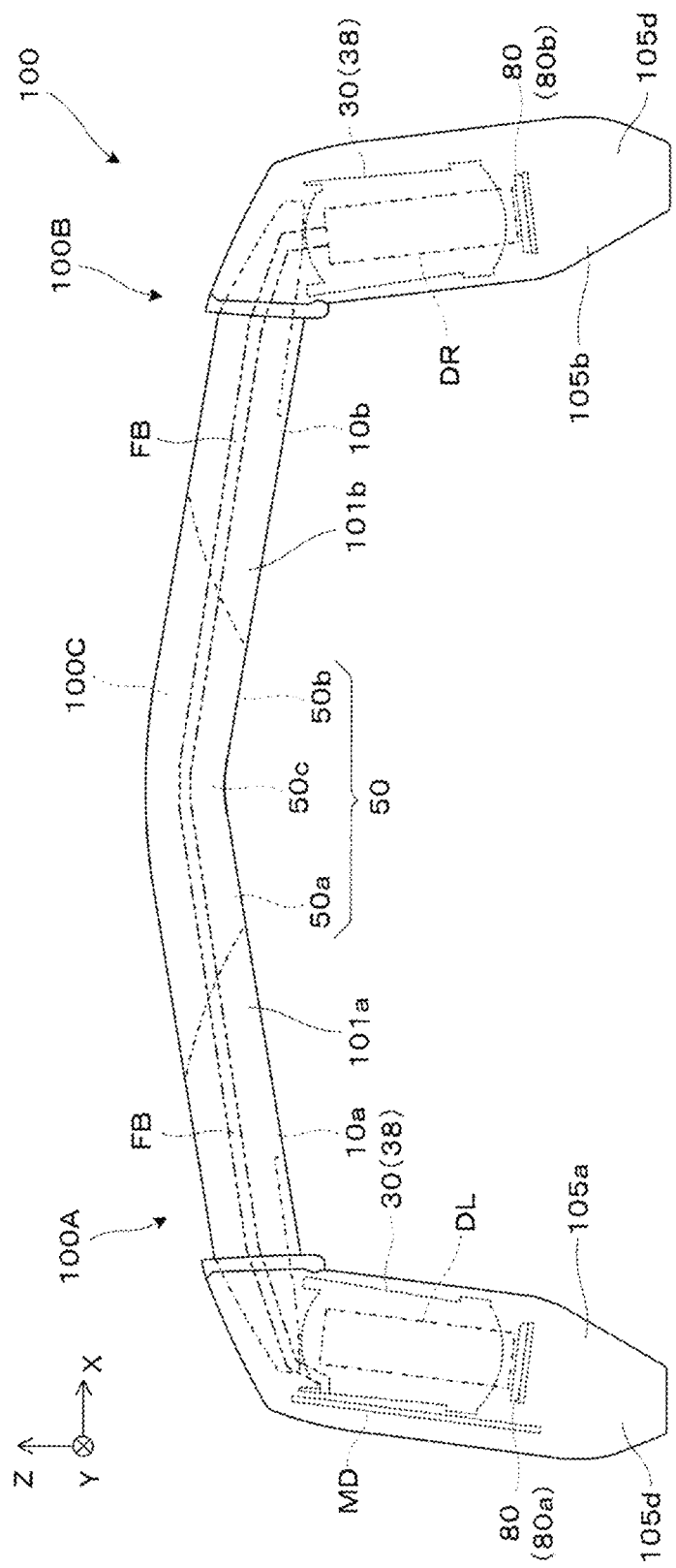
FIG. 2 is a conceptual plan view illustrating an optical configuration in the HMD as the virtual image display device.

Components of the HMD 100 are described below with reference to FIGS. 1 and 2. As illustrated in the drawings, the HMD 100 includes the first display device 100A and the second display device 100B. The first display device 100A and the second display device 100B are parts that form a virtual image for the left eye and a virtual image for the right eye, respectively. The first display device 100A for the left eye includes a first virtual image forming optical part 101a that covers the front of the eye of the user (observer) US in a manner allowing for see-through viewing, and a first image forming body part 105a that forms image light. The second display device 100B for the right eye includes a second virtual image forming optical part 101b that covers the front of the eyes of the user US in a manner allowing for see-through viewing, and a second image forming body part 105b that forms image light. In other words, the first display device 100A and the second display device 100B display images corresponding to the left and right eyes.

Temples 104, which are temple parts extending rearward from the sides of the head, are attached to the rear portions of the first and second image forming bodies 105a and 105b, and the temples 104 make contact with the ears, temples, and the like of the user to ensure the mounting state of the HMD 100. The first image forming body part 105a includes a display element 80, a lens barrel 38, and the like in a cover-shaped outer case 105d, and likewise, the second image forming body part 105b includes the display element 80, the lens barrel 38, and the like in the outer case 105d.

A specific example of an optical structure and the like of the HMD 100 that forms a virtual image as described above is described below with reference to FIG. 2.

First, as illustrated in the drawing, the first and second virtual image forming optical parts 101a and 101b include first and second light-guiding members 10a and 10b, respectively, which are light guide members formed of a resin material or the like, and are coupled to each other at a center with a central member 50 so as to form a transparent light-guiding unit 100C as an integral member. In other words, the transparent light-guiding unit 100C is a light-guiding unit that includes the pair of light-guiding members 10a and 10b and the central member 50.

The pair of light-guiding members 10a and 10b are a pair of optical members that contribute to a virtual image formation by internally propagating image light as components of the first and second virtual image forming optical parts 101a and 101b. As elaborated later, each of the light-guiding members 10a and 10b according to this embodiment includes a plurality of reflection surfaces to guide image light by reflecting the image light on the inner surface, and allows for visual recognition of the image light and external light in an overlapping manner. In particular, in this embodiment, at the boundary between reflection surfaces adjacent to each other among the plurality of reflection surfaces, the ends (edges or ridges) of the adjacent reflection surfaces overlap and match when viewed from a certain direction. In other words, in each of the light-guiding members 10a and 10b, the ends of the adjacent reflection surfaces match when projected from a specific direction.

The central member 50 is an integrally molded member that includes a pair of light transmission parts 50a and 50b and a bridge part 50c connecting the light transmission parts 50a and 50b, and is formed of a resin material or the like. The pair of light transmission parts 50a and 50b is joined to the pair of light-guiding members 10a and 10b, and thus the central member 50 functions as a coupling member that couples the first display device 100A and the second display device 100B. More specifically, in the central member 50, the light transmission part 50a, which is one of the pair of light transmission parts 50a and 50b, is joined to the light-guiding member 10a, and the other light transmission part 50b is joined to the light-guiding member 10b. Note that in the illustrated example, in the central member 50, the portion from the bridge part 50c to the light transmission part 50a and the portion from the bridge part 50c to the light transmission part 50b are smoothly connected with no bent portion (bending portion). The absence of such a bent portion (bending portion) or a step portion avoids a double-vision of an external image.

Note that the transparent light-guiding unit 100C is supported by outer cases 105d at both ends, i.e., on the outer end side of the light-guiding members 10a and 10b, as a composite light-guiding device 20 that provides the user US with a video for both eyes through light guidance.

The first image forming body part 105a includes the display element 80, the lens barrel 38, a main circuit board MD, a left-eye circuit board DL, and the like in the cover-shaped outer case 105d. The main circuit board MD is connected to each part through a flexible substrate FB as a cable. On the other hand, the second image forming body part 105b includes the display element 80, the lens barrel 38, a right-eye circuit board DR, and the like in the outer case 105d. Note that the outer case 105d is made of, for example, a magnesium alloy or the like.

For example, in the first image forming body part 105a, the display element 80 (80a) housed in the outer case 105d is a display device that emits image light to form an image corresponding to a virtual image for the left eye. The display element 80 is composed of, for example, an organic EL display panel, a panel for an LCD, or the like. A projection lens 30 emits image light from the display element 80, and constitutes a part of an image-forming system in the first virtual image forming optical part 101a. The lens barrel 38 holds, as a part of the projection lens 30, an image-forming optical element (not illustrated) constituting the projection lens 30. Note that, also in the second image forming body part 105b, the display element 80 (80b) and the projection lens 30 including the lens barrel 38, which are housed in the outer case 105d, serve the same function to form an image corresponding to a virtual image for the right eye. In the following description, regarding the left and right display elements 80, the element for the left eye and the element for the right eye may be referred to as the first display element 80a and the second display element 80b, respectively.

Figure 3:
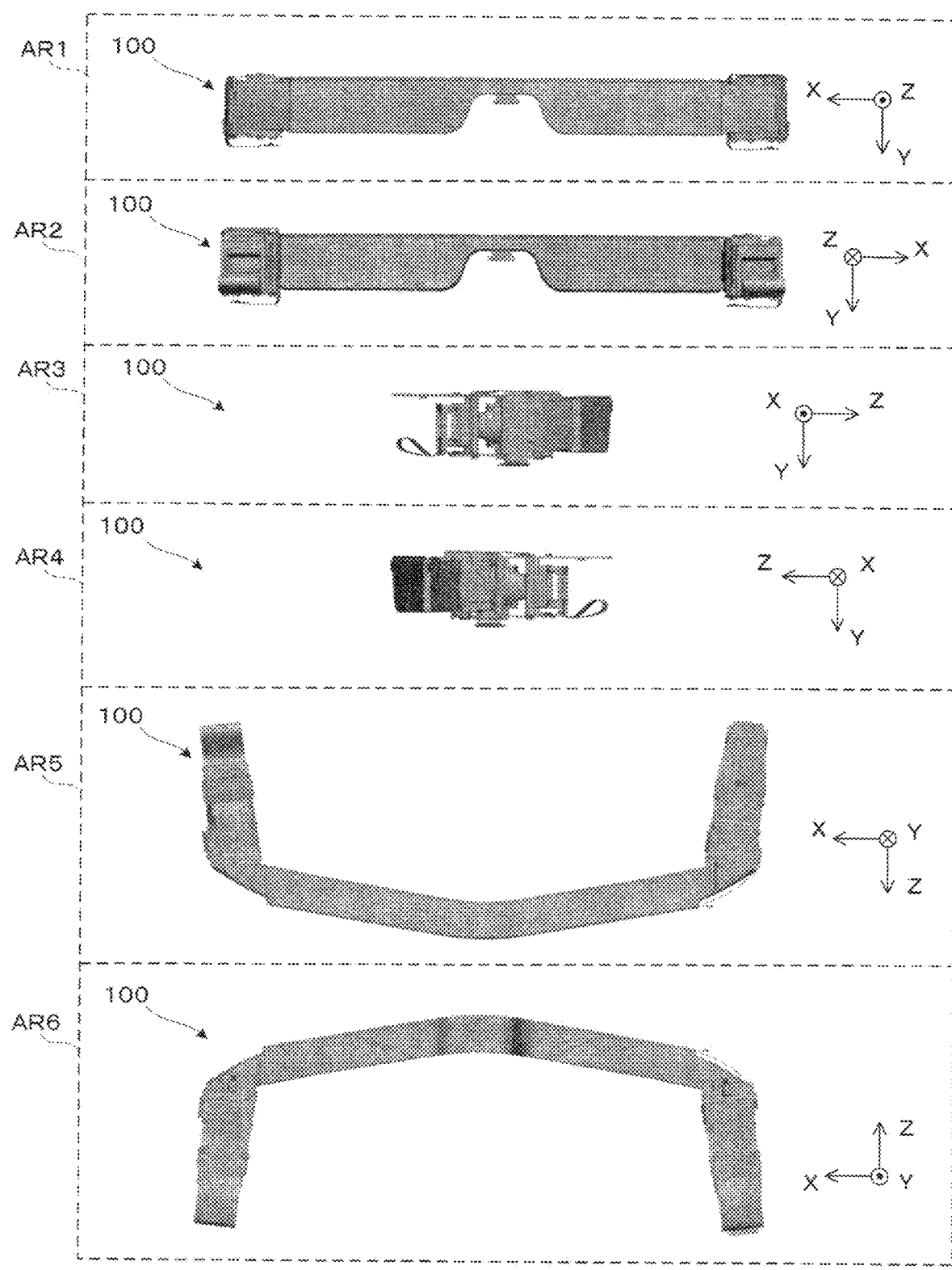
FIG. 3 is front, rear, left, right, top, and bottom views of the HMD.
Figure 4:
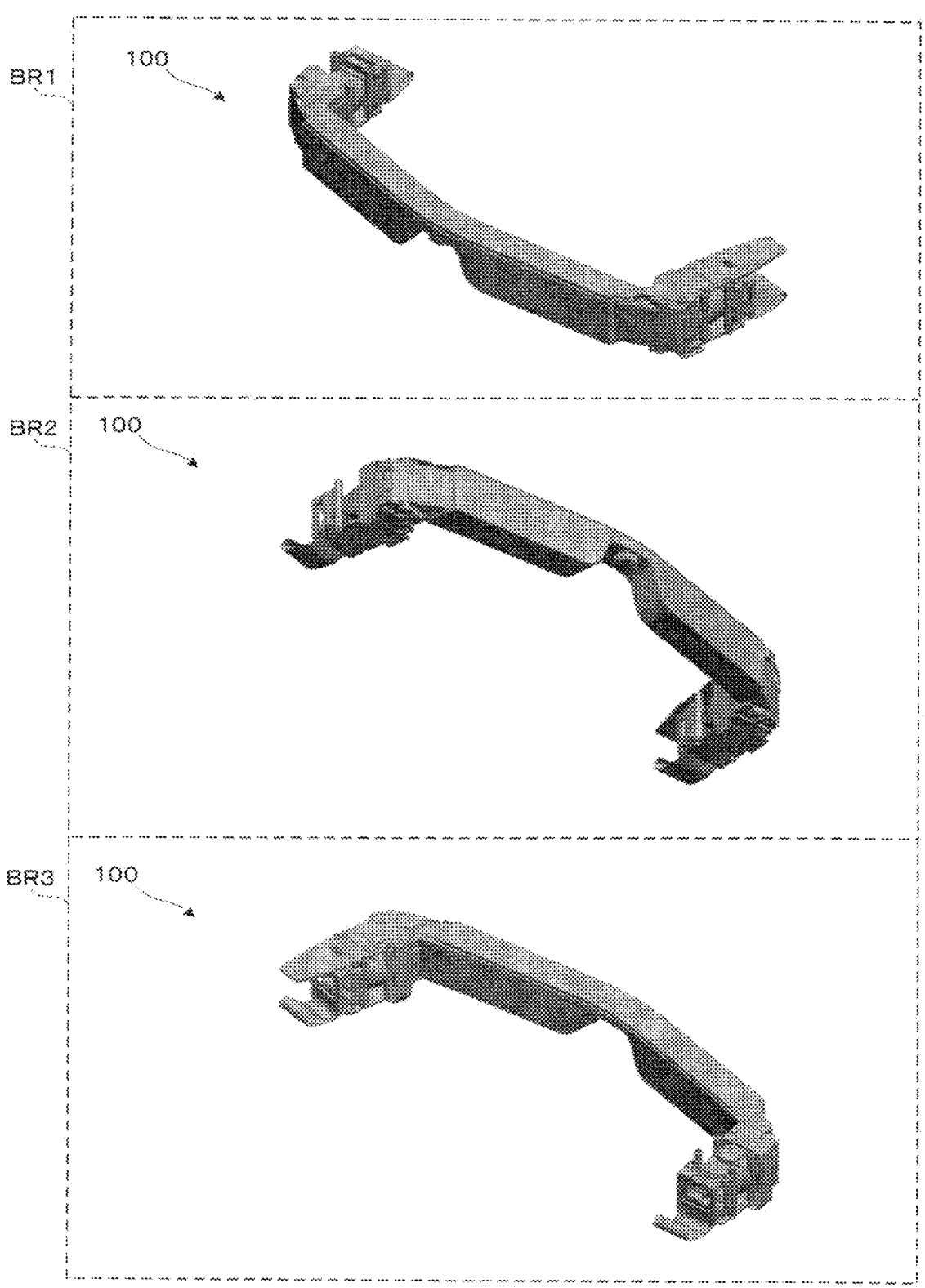
FIG. 4 is a perspective view of the HMD.

FIGS. 3 and 4 are diagrams illustrating an appearance of the virtual image display device, i.e., the HMD 100. Note that FIGS. 3 and 4 illustrate an appearance of the HMD 100 from which outer parts such as the outer case 105*d* (see FIG. 2 and the like) are removed. In addition, in FIGS. 3 and 4, light and shade are provided on the entire surface for the purpose of identifying the shape of the three-dimensional surface. In FIG. 3, a first region AR1 to a sixth region AR6 are a front view, a rear view, a left view, a right view, a top view, and a bottom view of the HMD 100. In FIG. 4, a first region BR1 to a third region BR3 are perspective views of the HMD 100 as viewed from different directions.

Figure 5:
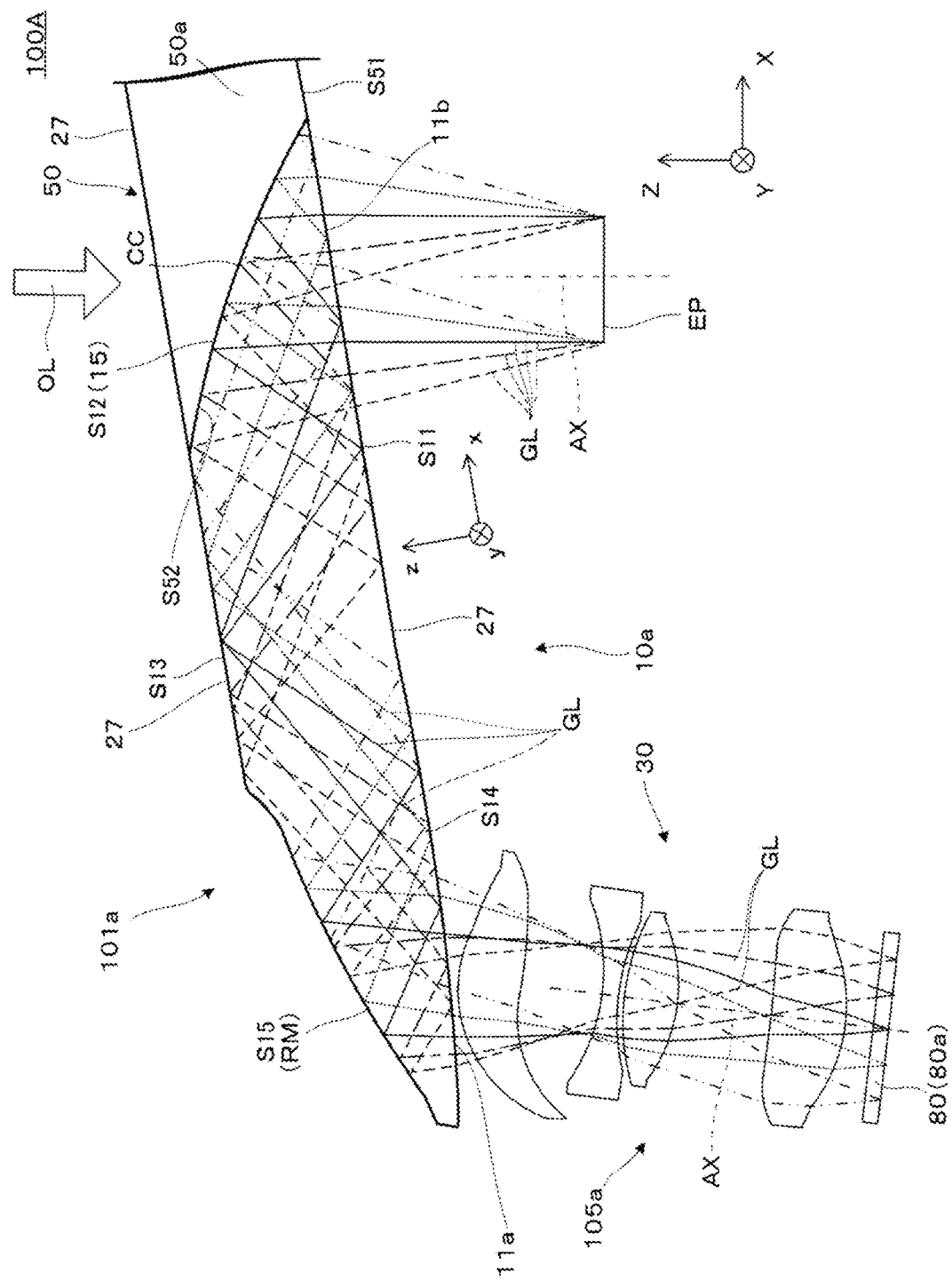
FIG. 5 is a plan view for describing an optical structure in the HMD as the virtual image display device.

An optical structure of the HMD 100 is described below with reference to FIG. 5. FIG. 5 is a diagram illustrating a portion of the first display device 100A, and especially describes an optical structure of the first virtual image forming optical part 101*a*. While the HMD 100 is composed of the first display device 100A and the second display device 100B (see FIG. 1 and the like) as described above, the first display device 100A and the second display device 100B have equivalent structures that are symmetric in the left-right direction. Therefore, only the first display device 100A is described below, and the description of the second display device 100B is omitted. Note that first to fifth surfaces S11 to S15 having an optical function for light guidance of image light in the light-guiding member 10*a* are provided. Among them, the first surface S11 and the third surface S13 that occupy main positions at the front of the eye are parallel flat surfaces.

The light transmission part 50*a* includes a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is located on a plane extended from the first surface S11 of the light-guiding member 10*a*, the second transmission surface S52 is a curved surface that is joined to and integrated with the second surface S12, and the third transmission surface S53 is located on a plane extended from the third surface S13 of the light-guiding member 10.

The light-guiding member 10*a* of the first virtual image forming optical part 101*a* is joined to the light transmission part 50*a* through an adhesive layer CC. In other words, the second transmission surface S52 of the light transmission part 50*a* is disposed opposite the second surface S12 of the light-guiding member 10*a* and has the same shape as the second surface S12. The light-guiding member 10*a* and the light transmission part 50*a* have a structure in which the surface of a body member that provides a three-dimensional shape including an optical surface is covered with a thin hard coat layer 27. The body member of light-guiding member 10*a* and the light transmission part 50*a* is formed of a resin material with high optical transparency in a visible range, and is molded by injecting a thermoplastic resin into a mold and curing the resin, for example.

An overview of optical paths of image light GL is described below. Note that, in the following description, the first to fifth surfaces S11 to S15 are described as surfaces that function as reflection surfaces, transparent surfaces, and the like as a result of various treatments such as joining of the above-described parts. The light-guiding member 10*a* guides, toward the eye of the user (wearer) US, the image light GL emitted from the projection lens 30 through reflection at the first to fifth surfaces S11 to S15 and the like. Specifically, the image light GL from the projection lens 30 first impinges on the part of the fourth surface S14 formed in a light incidence part 11*a* so as to be reflected by the fifth surface S15, which is an inner surface of a reflection film RM, and again impinges on the fourth surface S14 from the inner side so as to be totally reflected. Then, the image light GL impinges on the third surface S13 so as to be totally reflected, and impinges on the first surface S11 so as to be totally reflected. The image light GL totally reflected by the first surface S11 impinges on the second surface S12 and partially passes through the second surface S12 where a half mirror 15 is provided while being partially reflected so as to again impinge on and pass through the part of the first surface S11 formed in a light emission part 11*b*. The image light GL having passed through the first surface S11 generally travels along an optical axis AX, which is substantially parallel to the Z direction. Then, the image light GL impinges on an exit pupil EP where the eye of the user US is located as a substantially parallel light flux. In other words, the user US observes an image with image light as a virtual image. As described above, in the configuration described above, the fourth surface S14 is a light incidence surface through which image light GL from the display element 80 (first display element 80*a*) enters the light-guiding member 10*a*, and the first surface S11 is a light emission surface that emits the image light GL from the light-guiding member 10*a*. In addition, of the first to fifth surfaces S11 to S15 that constitute the plurality of reflection surfaces, the first surface S11 and fourth surface S14 adjacent to each other are surfaces disposed on the observation side. In other words, the first surface S11 and the fourth surface S14 are surfaces that are disposed closer to the user (observer) than other surfaces, namely, the second surface S12, the third surface S13, and the fifth surface S15. In addition, the second surface S12 is a semi-transparent reflection surface that reflects the image light GL and allows the external light OL to pass therethrough.

In addition, the first virtual image forming optical part 101*a* allows for visual recognition of image light by the user US with the light-guiding member 10*a*, and also allows for observation of an external image with little distortion by the user US in the state where the light-guiding member 10*a* and the light transmission part 50*a* are combined. Here, since the third surface S13 and the first surface S11 are substantially parallel to each other, the diopter is approximately 0 in the observation of transmission therethrough, and thus almost no aberration or the like is caused for the external light OL. In addition, the third transmission surface S53 and the first transmission surface S51 are flat surfaces that are substantially parallel to each other. Further, the third transmission surface S53 and the first surface S11 are flat surfaces that are substantially parallel to each other, and therefore cause almost no aberration or the like. Thus, the user US observes the external image with no distortion through the light transmission part 50*a*. Although illustration and description are omitted, an image and an external image of image light from the second display element 80*b* (see FIG. 2) are observed in a manner similar to the above-mentioned manner.

Here, the directions in the light-guiding member 10*a* are defined with respect to the first surface S11 of the surfaces defining the surface shape. In FIG. 5 and the like, x, y, and z are a rectangular coordinate system in which, in the light-guiding member 10*a*, the +x direction and the +y direction are directions parallel to the in-plane direction of the first surface S11, which is a flat surface, and the +y direction is a direction parallel to the +Y direction. In addition, the +z direction is a direction perpendicular to the +x direction and the +y direction, and corresponds to the normal direction of the first surface S11.

Note that the light-guiding device 20 is formed by joining base materials for the light-guiding members 10a and 10b and the light transmission member 50, and coating the joined base materials through dip treatment. In other words, the hard coat layer 27 of the light-guiding members 10a and 10b is provided on the entire light-guiding device 20 together with the light transmission member 50.

A structure or shape of the light-guiding members 10a and 10b is described in more detail below with reference to FIG. 6 and the like. Note that the light-guiding member 10a and the light-guiding member 10b have equivalent structures that are symmetric in the left-right direction. Therefore, only the light-guiding member 10a is described below, and the description and illustration of the light-guiding member 10b are omitted.

Figure 6:
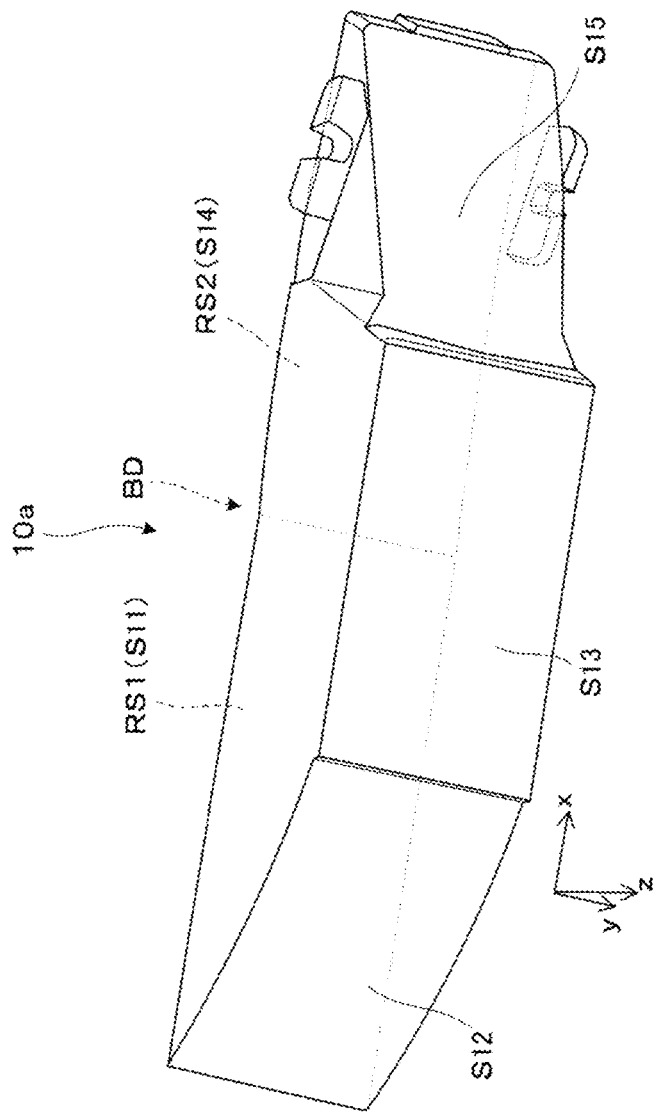
FIG. 6 is a perspective view illustrating a shape of a light-guiding member.
Figure 7:
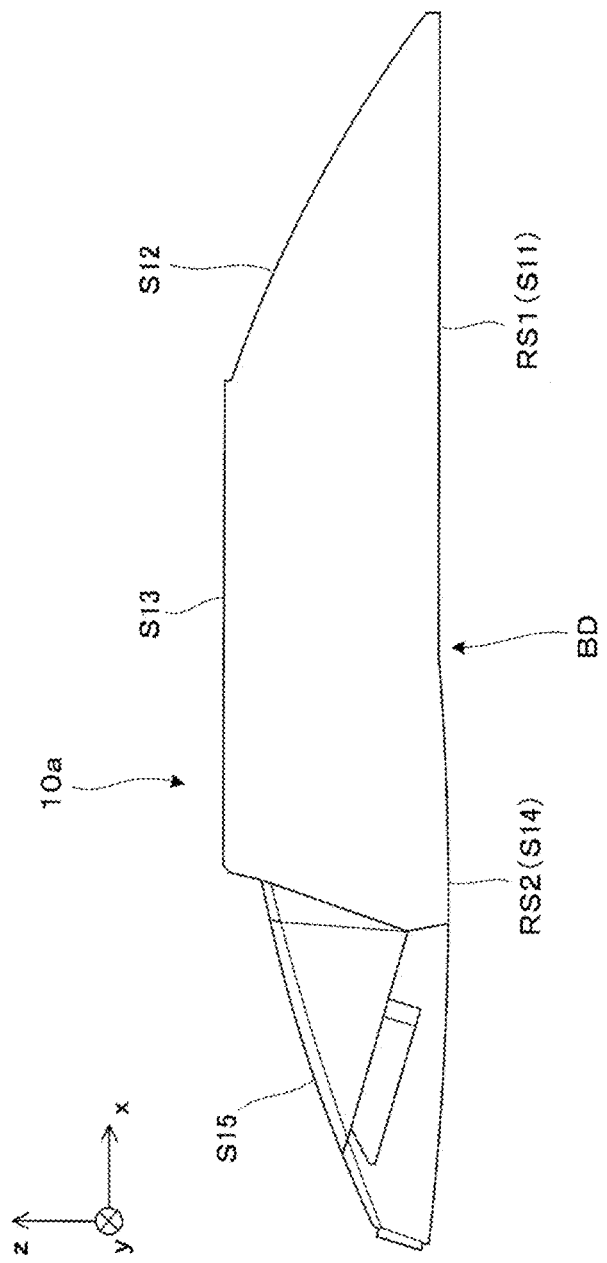
FIG. 7 is a plan view illustrating a shape of the light-guiding member.
Figure 8:
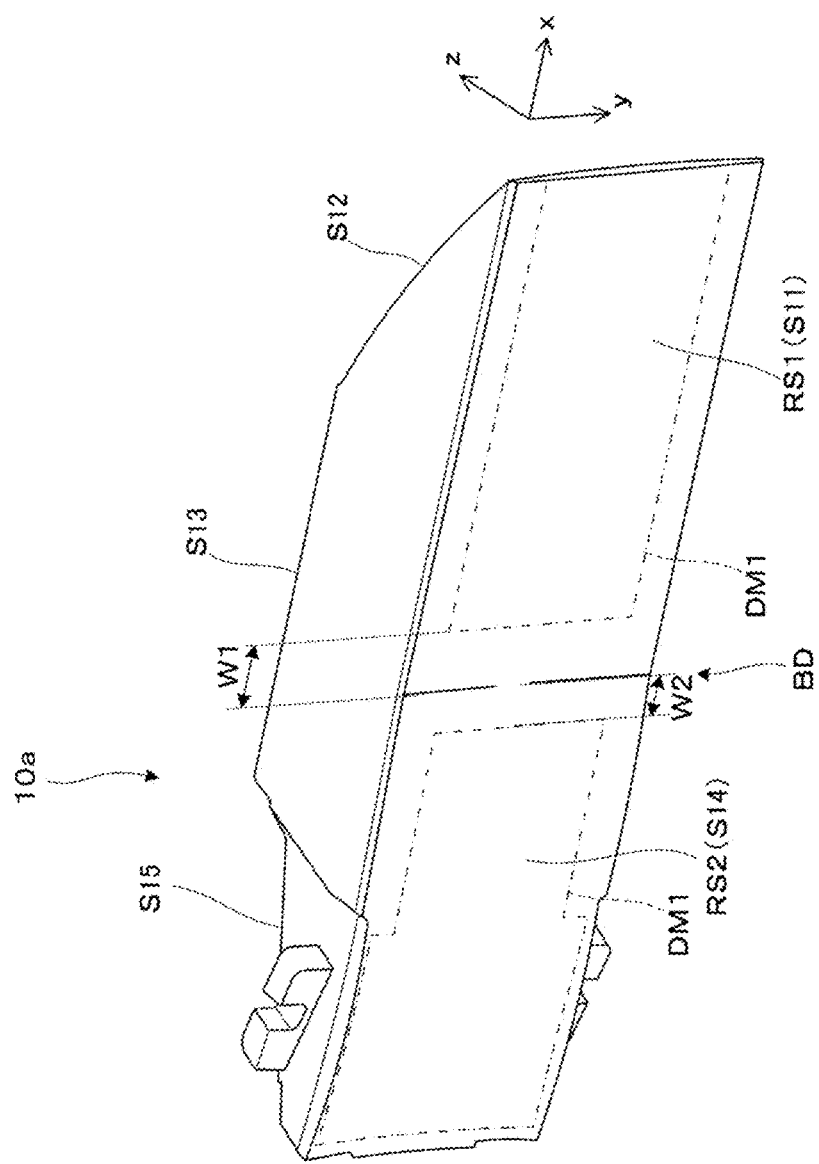
FIG. 8 is a perspective view illustrating an optical effective region of the light-guiding member.
Figure 9:
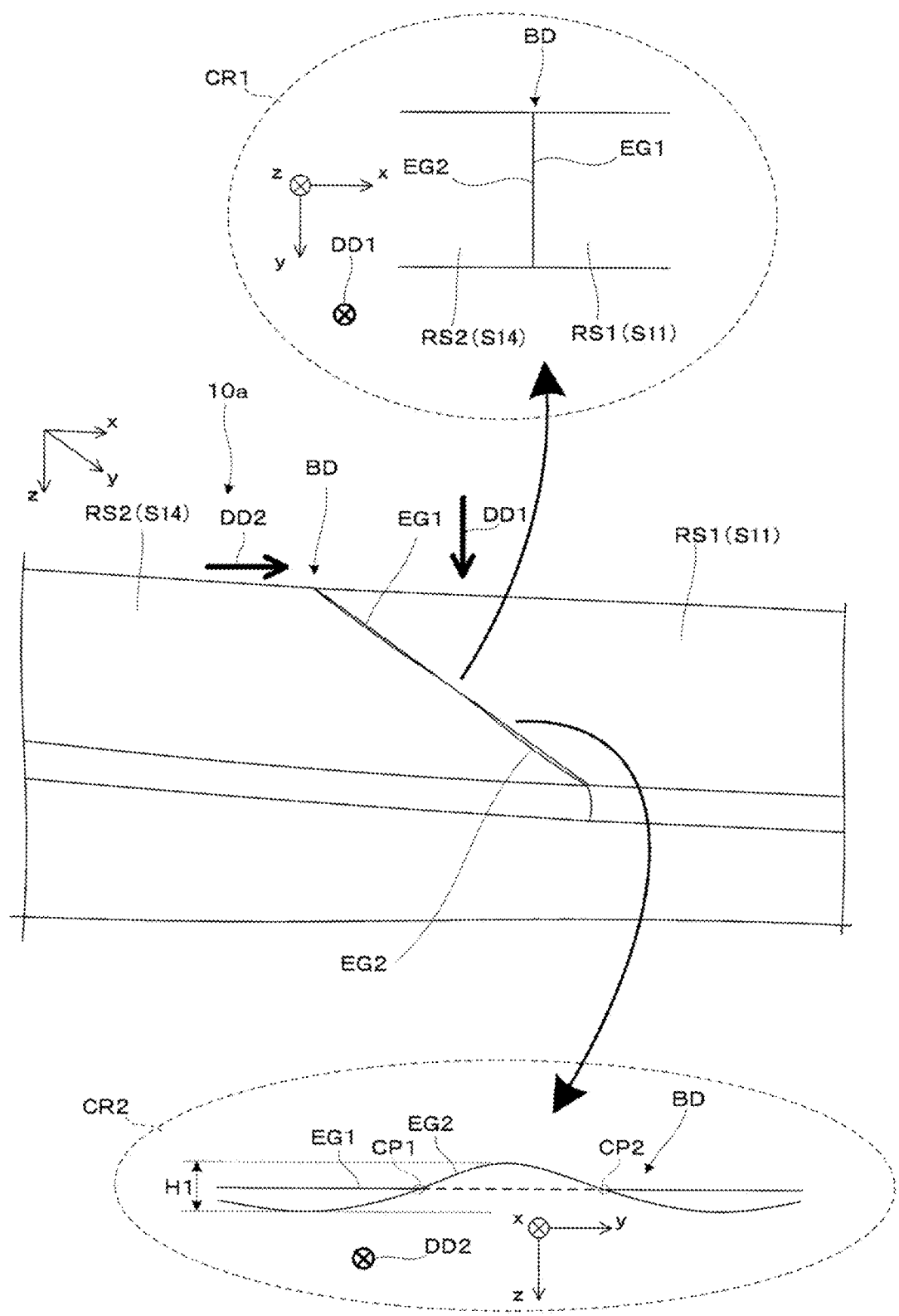
FIG. 9 is a partially enlarged perspective view of the light-guiding member.

FIG. 6 is a perspective view illustrating a shape of the light-guiding member 10a, FIG. 7 is a side view illustrating a shape of the light-guiding member 10a, and FIG. 8 is a perspective view of the light-guiding member 10a as viewed from an angle different from that of FIG. 6 and illustrates an optical effective region of the light-guiding member 10a. FIG. 9 is a partially enlarged perspective view of the light-guiding member 10a.

Here, from a viewpoint of reducing a situation where visibility is affected by leaked light, ghost light and the like occurred in a configuration described with reference to FIG. 5 in which see-through viewing is achieved using the light-guiding member 10a or the like, the first to fifth surfaces S11 to S15, which are the plurality of reflection surfaces that constitute the light-guiding member 10a, are defined from another perspective.

First, as a precondition of the definition, the features of the first to fifth surfaces S11 to S15 are described. In the light-guiding member 10a, a curved surface is included in the first to fifth surfaces S11 to S15, which guide the image light from the display element 80 through reflection on the inner surface. Specifically, of the first to fifth surfaces S11 to S15, the third surface S13 and the first surface S11 are flat surfaces substantially parallel to each other as described above, whereas the remaining surfaces, namely, the first surface S12, the fourth surface S14, and the fifth surface S15 are curved surfaces. In general, for an HMD, there is a demand for downsizing of the device, and in particular, a free curved surface, i.e., an asymmetric aspheric surface is often adopted as a curved surface. As such, a curved surface is used also in the light-guiding member 10a that constitutes the optical part of the HMD 100 of this embodiment, and a free curved surface is adopted in, for example, the fourth surface S14 and the like of the plurality of reflection surfaces. On the other hand, in this embodiment, the first surface S11 adjacent to the fourth surface S14 is a flat surface as described above so that favorable visibility for external light is maintained to satisfy the demand for see-through viewing. In this case, how the connection between the fourth surface S14 composed of a free curved surface and the first surface S11 composed of a flat surface, or more specifically, a boundary BD between adjacent surfaces at least one of which includes a curved surface (here, of the fourth surface S14 and first surfaces S11 adjacent to each other, the fourth surface S14 is a curved surface) among the plurality of reflection surfaces (the first to fifth surfaces S11 to S15) is formed is important. The reason for this is that the boundary BD of such a location, the shape of the surroundings thereof and the like may lead to occurrence of leaked light and/or ghost light.

In light of the above, first, regarding the first surface S11 and the fourth surface S14, which are a pair of adjacent reflection surfaces disposed on the observer side among the plurality of reflection surfaces S11 to S15 of the light-guiding member 10a, the first surface S11 relatively located on the emission side of the image light GL is assumed to be a first reflection surface RS1, and the fourth surface S14 relatively located on the incident side of the image light GL is assumed to be a second reflection surface RS2 as another perspective (definition) of the first to fifth surfaces S11 to S15. That is, the second reflection surface RS2 on the incident side is a free curved surface (fourth surface S14), and the first reflection surface RS1 on the emission side is a flat surface (first surface S11). In this case, in an example illustrated in FIG. 9 in a partially enlarged manner for example, an end EG1 of the first reflection surface RS1 composed of a flat surface is a straight line extending along the y direction, whereas an end EG2 of the second reflection surface RS2 composed of a free curved surface is a curved line. Accordingly, the end EG1 of the first reflection surface RS1 and the end EG2 of the second reflection surface RS2 cannot completely match each other, and a step portion is inevitably formed at the boundary BD.

Under such circumstances, in this embodiment, regarding the first reflection surface RS1 and the second reflection surface RS2 adjacent to each other, the end EG1 of the first reflection surface RS1 and the end EG2 of the second reflection surface RS2 have shapes that match when projected from a specific direction DD1 (the +z direction, i.e., the normal direction of the first reflection surface RS1) at the boundary BD between the first reflection surface RS1 and the second reflection surface RS2. Specifically, as conceptually illustrated in a partially enlarged manner in a first region CR1 surrounded by a dashed line, the end EG2 extends along the y direction such that the end EG2 and the end EG1, which is a straight line extending along the y direction, match each other at the boundary BD in the state where it is projected from a specific direction DD1 (+z direction) to a plane (xy plane) perpendicular to the direction DD1 (i.e., in a plan view of the xy plane). Therefore, they match when viewed from the specific direction DD1 (the +z direction, i.e., the normal direction of the first reflection surface RS1).

On the other hand, when viewed in another direction DD2 (the +x direction) as conceptually illustrated in a partially enlarged manner in a second region CR2 surrounded by a dashed line, the end EG1 of the flat surface is a straight line with no unevenness (undulations), whereas the end EG2 of the free curved surface is a curved line with unevenness (undulations) in the +z direction, with a height difference H therebetween. That is, a step height is inevitably caused at the boundary BD.

In this embodiment, to reduce the height difference H, it is designed such that the curvature at or near the end EG2 of the second reflection surface RS2 composed of a free curved surface is adjusted such that it is closer to a flat surface. Here, a situation where reflection or scattering of unintended external light occurs at the boundary BD and affects visibility is avoided or reduced by suppressing the height difference H to approximately 10 μm, for example, although it depends on the entire configuration of the optical design.

In the example illustrated in the second region CR2, intersection points CP1 and CP2 are provided as points where the end EG1 and the end EG2 are crossed in a region from the center side to the peripheral side. Specifically, as illustrated in the drawing, in the region between the intersection point CP2 and the intersection point CP1 on the center side of the optical functional surface in the y-direction, the end EG1 side, i.e., the first reflection surface RS1 (first surface S11) side is relatively depressed to the +z direction, and the end EG2 side, i.e., the second reflection surface RS2 (fourth surface S14) side is relatively projected to the −z direction. Conversely, in the region on the +y side of the intersection CP2 and the region on the −y side of the intersection CP1 on the peripheral side of the optical functional surface, the first reflection surface RS1 (first surface S11) side is relatively projected to the −z direction, and the second reflection surface RS2 (fourth surface S14) side is relatively depressed to the +z side. With such a configuration having the intersection points CP1 and CP2, the step height resulting from the difference in the shapes of the end EG1 and the end EG2 can be reduced (lowered) as much as possible, and, by extension, leaked light and the like can be suppressed. Note that the relationship of the unevenness is an example, and various modification may be made.

Now, returning to FIG. 8, the optically effective region (optical effective region) in the first reflection surface RS1 and the second reflection surface RS2 is considered. For example, as illustrated in the drawing, the optical effective region in the first reflection surface RS1 is referred to as an optical effective region DM1, and the optical effective region in the second reflection surface RS2 is referred to as an optical effective region DM2. Further, the positional relationships of the regions with the boundary BD are defined by, for example, widths W1 and W2 in the x direction. In this case, the HMD 100 capable of displaying a virtual image with a desired angle of view can be configured with a design in which the width W1 is approximately 4.3 mm and the width W2 is approximately 2.8 mm, for example. In this case, the shape of the region at and near the boundary BD can be set to the desired state where the step height is small at the boundary BD as described above, while providing some margin for the region that can be used as the optical effective region based on the widths W1 and W2.

Figure 10:
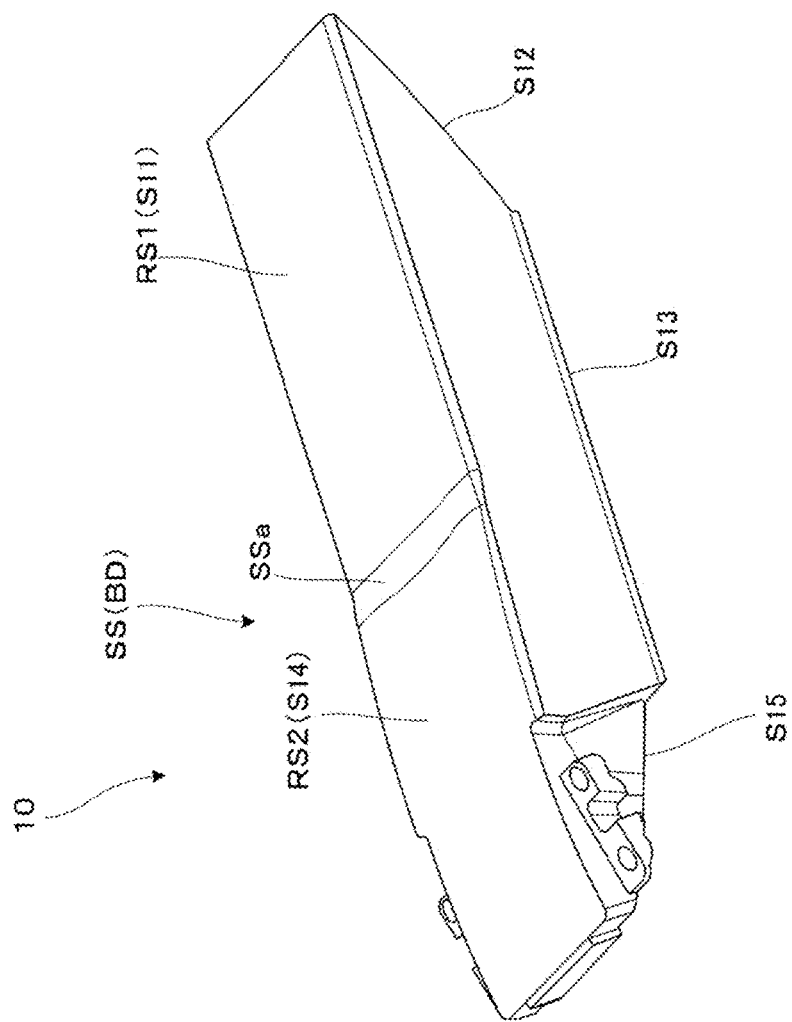
FIG. 10 is a perspective view illustrating a light-guiding member of a comparative example.

A light-guiding member of a comparative example illustrated in a perspective view of FIG. 10 is described below. A light-guiding member 10 of the comparative example illustrated in FIG. 10 includes a connection surface SSa between the first reflection surface RS1 and the second reflection surface RS2, or includes a connecting part SS for providing the connection surface SSa as the boundary BD. In this regard, this comparative example is different from the embodiment.

More specifically, as in the embodiment, the light-guiding member 10 in FIG. 10 includes the first surface S11 relatively located on the emission side of the image light as the first reflection surface RS1 and the fourth surface S14 relatively located on the incident side of the image light GL as the second reflection surface RS2. The light-guiding member 10 further includes, as the boundary BD, the connecting part SS for connecting the first reflection surface RS1 and the second reflection surface RS2. That is, the connection surface SSa is provided in the light-guiding member 10 as the surface of the connecting part SS, or more specifically, a surface connecting the first reflection surface RS1 and the second reflection surface RS2. Note that the connection surface SSa is a surface that continuously and smoothly connects the first reflection surface RS1 and the second reflection surface RS2. In this case, in addition to a molding piece for the first reflection surface RS1 and a molding piece for the second reflection surface RS2, a molding piece for the connection surface SSa is required for forming the surface from the first reflection surface RS1 to the second reflection surface RS2 of the light-guiding member 10 in molding of the light-guiding member 10, for example. That is, three pieces are required.

In contrast, in the embodiment, the molding piece for the connection surface SSa is not required. Specifically, the optical surface (optical functional surface) corresponding to that region can be created with two molding pieces for the first reflection surface RS1 and the second reflection surface RS2. Note that, in this case, it corresponds to the portion where the boundary BD including the end EG1 of the first reflection surface RS1 and the end EG2 of the second reflection surface RS2 is formed in the portion where the two pieces are put together. In other words, by putting together the ends of the two pieces, the boundary BD, and by extension, the light-guiding member 10*a* and the light-guiding member 10*b*, can be formed such that the ends EG1 and EG2 match when projected in a specific direction (the normal direction of the first reflection surface RS1).

Figure 11:
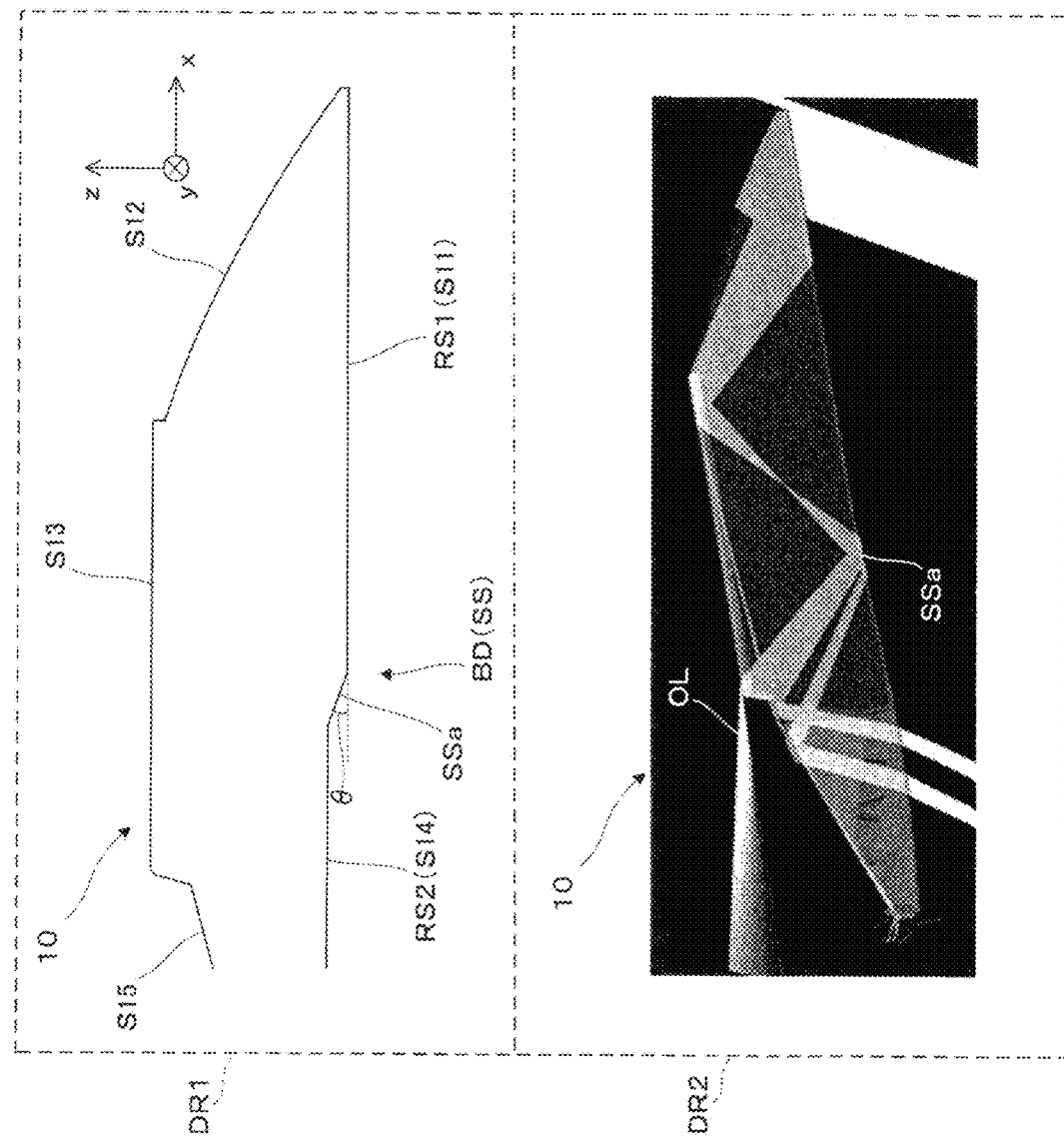
FIG. 11 is a diagram for describing a light-guiding member of another comparative example.

For example, it is also conceivable to adopt a configuration in which, in the light-guiding member 10 of the comparative example illustrated in FIG. 10, the second reflection surface RS2 projects to the user side than the first reflection surface RS1 so that even if the external light is reflected at the connection surface SSa, the external light is less visually recognized. In this case, however, to maintain the angle of view of an image (virtual image) to be visually recognized and the like, the size of the entire optical system has to be increased. In view of this, it is also conceivable to maintain the downsizing of the entire optical system by setting state where the first reflection surface RS1 is projected to the user side than the second reflection surface RS2 as in another comparative example illustrated in a first region DR1 in FIG. 11. In this case, however, as illustrated in the second region DR2, unintended reflection of the external light OL and the like at the connection surface SSa may affect the visibility depending on the value of an angle θ of the connection surface SSa illustrated in the drawing.

In the embodiment, such a situation is avoided by adopting the configuration in which a part corresponding to the connection surface SSa is not provided. Note that also in the embodiment, it is desirable, from the viewpoint of the angle θ described above, that the value corresponding to the angle θ be zero or a value close to it as much as possible also in the relationship of the angle between the first reflection surface RS1 and the second reflection surface RS2 at the boundary BD. The light-guiding member 10*a* of the example illustrated in the drawing has such a shape.

Figure 12:
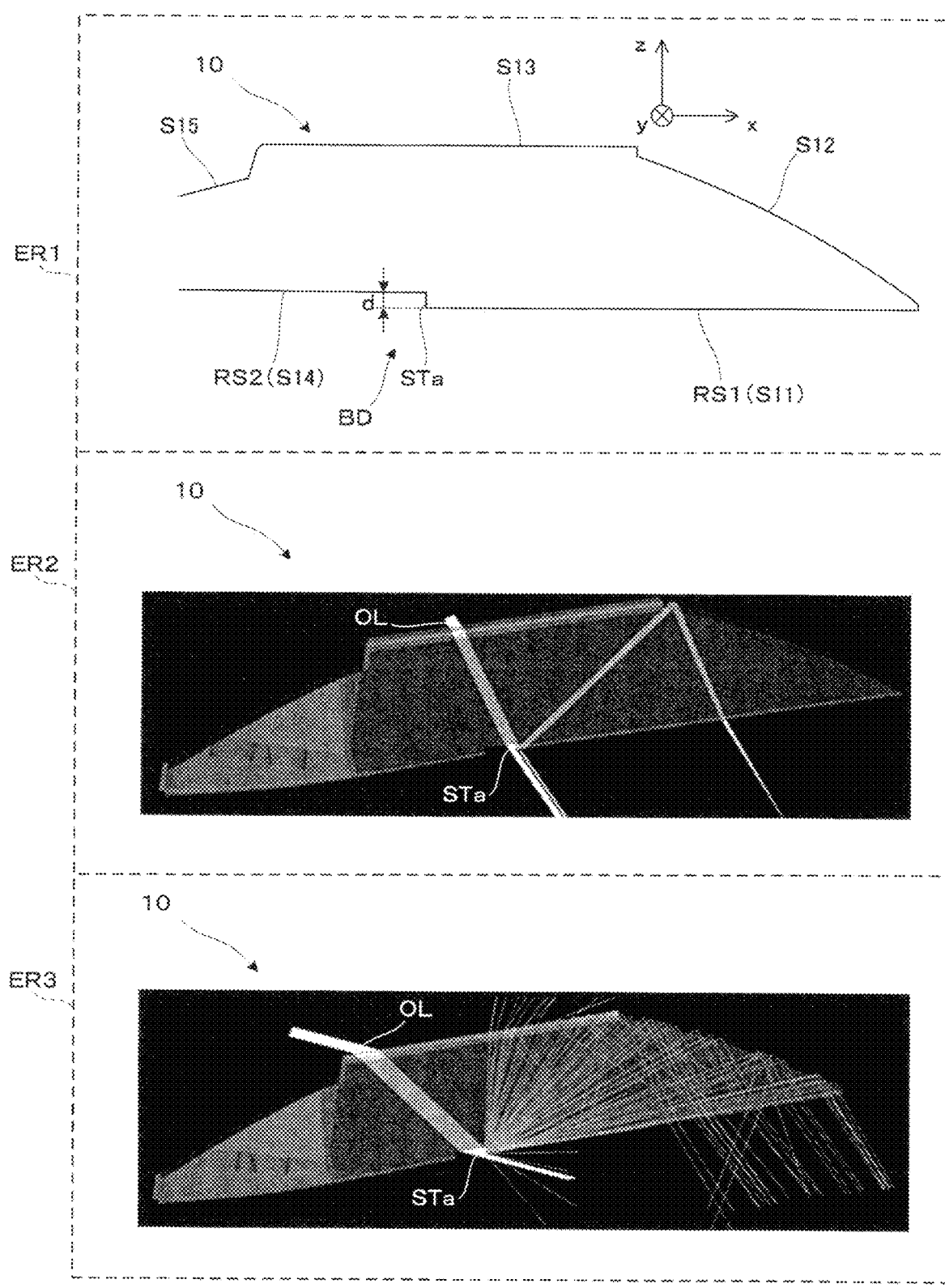
FIG. 12 is a diagram for describing a light-guiding member of another comparative example.

Now, with reference to the light-guiding member 10 of another comparative example illustrated in FIG. 12 and the like, a relationship between light leakage and the step height at the boundary BD between the first reflection surface RS1 and the second reflection surface RS2 is considered. The light-guiding member 10 illustrated in a first region ER1 in FIG. 12 differs from the embodiment in that the first reflection surface RS1 is projected to the user side than the second reflection surface RS2, and that a step surface STa that forms a large step height d (unit: mm) is provided at the boundary BD. In this case, as illustrated in the second region ER2 for example, in the case where the step surface STa is a mirror surface, leaked light resulting from the external light OL or the like will directly impinge on the eye of the user US, and the light will be visually recognized with at a significant brightness depending on the environment. For this reason, it is desirable that the step surface STa be a diffusion surface, for example. However, if the step surface STa is too large, light incident on the eye of the user US may not be completely avoided even in the case where the step surface STa is provided as a diffusion surface as illustrated in the third regions ER3.

Figure 13:
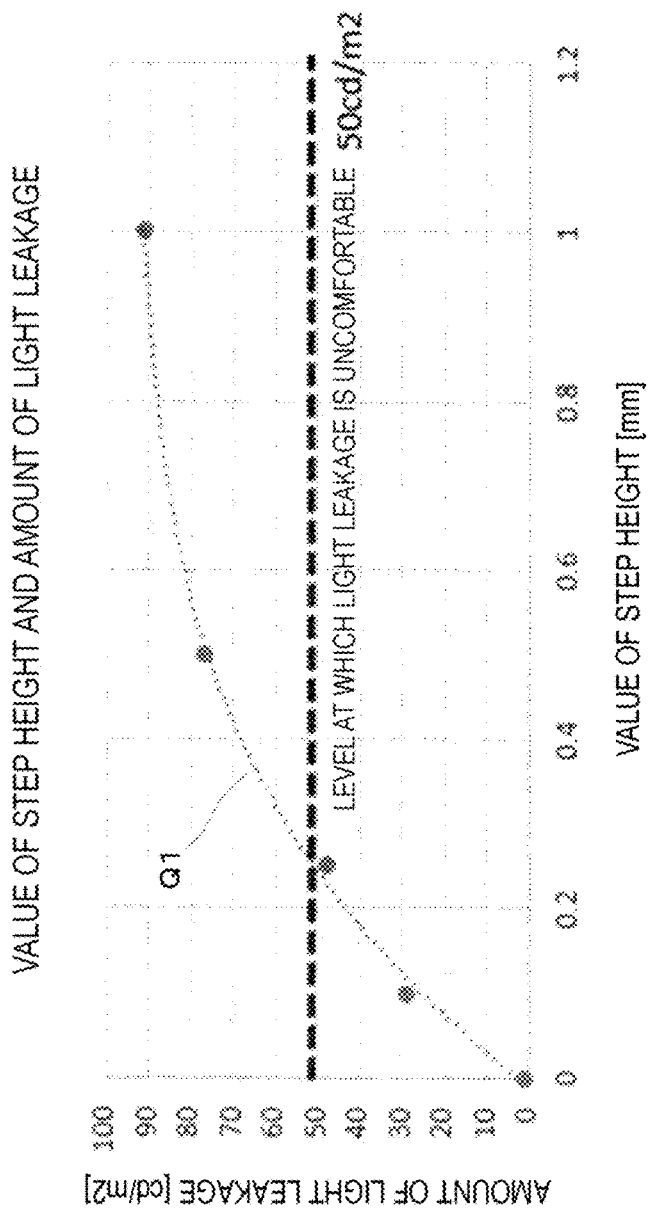
FIG. 13 is a graph showing a relationship between a step height and light leakage in the light-guiding member.

The graph in FIG. 13 shows a relationship between the step height and the light leakage when the step height d is changed in the light-guiding member 10 having the configuration illustrated in FIG. 12. The horizontal axis is a step height (the value of the step height) d (unit: mm), and the vertical axis is the amount of light leakage occurred at the step height d. In this case, a curve Q1 indicates a luminance value of light leakage that can be seen as a result of light leakage in an assumed indoor environment in which a typical fluorescent light is placed in the ceiling, for example. In consideration of the fact that the level at which visually recognized light leakage is uncomfortable is approximately 50 cd/m$^2$ as exemplified in the graph, the step height d is desirably 0.25 mm or smaller, for example. In the above-described example for the embodiment, for example, the height difference H illustrated in FIG. 9 is set to 0.25 mm or smaller (approximately 10 μm) as described above, and thus the influence of light leakage is sufficiently suppressed.

As described above, the virtual image display device, i.e., the HMD 100 of the embodiment includes the display element 80 and the light-guiding member 10a that includes the first to fifth faces S11 to S15 as the plurality of reflection surfaces and guides image light from the display element 80 by reflecting the image light at an inner surface to cause the image light GL and the external light OL to be visually recognized in an overlapping manner. The first to fifth surfaces S11 to S15 that constitute the light-guiding member 10a include the first reflection surface RS1 (first surface S11) and the second reflection surface RS2 (fourth surface S14) that are adjacent to each other and include a curved surface in at least one of them, and the end EG1 of the first reflection surface RS1 and the end EG2 of the second reflection surface RS2 match when projected from the specific direction DD1 at the boundary between the first reflection surface RS1 and the second reflection surface RS2. In this case, in the case of the HMD 100, it is not necessary to provide a mold for the connection surface that connects the first reflection surface RS1 and the second reflection surface RS2 at the boundary BD. In addition, in this case, a situation where a part of the external light and/or the image light becomes leaked light or ghost light due to the connection surface and the like can be avoided, and thus favorable visibility can be maintained. Further, failure of the hard coat can be suppressed at the boundary BD between the first reflection surface RS1 and the second reflection surface RS2.

Modifications and Other Matters

The structures described above are examples, and various modifications may be made to the extent that similar functions can be achieved.

For example, while one light-guiding member is used to guide the image light to the eye of the user in the above description, it is also possible to apply the technique of the present disclosure to a configuration composed of a plurality of light-guiding members (such as a plurality of light-guiding prisms).

While the boundary between the flat surface and the curved surface (the free curved surface) is described above, the present disclosure is not limited thereto, and the technique of the present disclosure may be applied at the boundary connecting curved surfaces.

In addition, the technique of the present disclosure may be applied to a hand-held display of a binocular type and the like.

In addition, while the second surface S12 provided with a semi-transparent reflection surface that allows a part of the video light to pass therethrough while reflecting another part of the light is described above, it is also conceivable to achieve a function equivalent to the operation of the second surface S12 by providing an optical functional surface such as a diffraction element of a volume hologram and the like, for example, instead of the second surface S12.

While the display element 80 is an organic EL display panel or a panel for an LCD in the description above, the display element 80 may be a self-luminous display element represented by an LED array, a laser array, a quantum dot light-emitting element, and the like. Further, the display element 80 may be a display using a laser scanner composed of a combination of a laser light source and a scanner. Note that a liquid crystal on silicon (LCOS) technique may be used instead of an LCD panel.

As described above, a virtual image display device according to a specific aspect includes a display element, and a light-guiding member including a plurality of reflection surfaces and configured to guide image light from the display element by reflecting the image light at an inner surface, and cause the image light and external light to be visually recognized in an overlapping manner. The plurality of reflection surfaces of the light-guiding member includes a first reflection surface and a second reflection surface adjacent to each other, at least one of the first reflection surface and the second reflection surface including a curved surface. At a boundary between the first reflection surface and the second reflection surface, an end of the first reflection surface and an end of the second reflection surface match when projected from a specific direction.

In the case of the above-described virtual image display device, it is not necessary to provide a mold for the connection surface that connects the first reflection surface and the second reflection surface in the molding. In addition, in this case, a situation where a part of the external light and/or the image light becomes leaked light or ghost light due to the connection surface and the like can be avoided, and thus favorable visibility can be maintained. Further, failure of the hard coat at the boundary between the first reflection surface and the second reflection surface can be suppressed.

In a specific aspect, the first reflection surface is a flat surface, the second reflection surface is a free curved surface, and the specific direction is a normal direction of the first reflection surface. In this case, when viewed in the normal direction of the first reflection surface, the end of the first reflection surface composed of the flat surface and the end of the second reflection surface composed of the free curved surface match each other.

In another aspect, a step height in the specific direction at the boundary between the first reflection surface and the second reflection surface is 0.25 mm or smaller. In this case, the influence of leaked light or the like due to the step height at the boundary can be sufficiently suppressed.

In another aspect, the light-guiding member includes a portion where the end of the first reflection surface and the end of the second reflection surface are crossed in a region from a center side to a peripheral side at the boundary between the first reflection surface and the second reflection surface. In this case, the step height caused at the boundary can be suppressed.

In another aspect, the second reflection surface is a light incidence surface through which the image light from the display element enters the light-guiding member, and the first reflection surface is a light emission surface through which the image light is emitted from the light-guiding member. In this case, an optical system of a small size can be achieved and, by extension, miniaturization of the entire device can be achieved.

In another aspect, the first reflection surface and the second reflection surface are surfaces disposed on an observation side among the plurality of reflection surfaces. In this case, a portion where leaked light and/or ghost light is easily generated can be appropriately handled.

In another aspect, a first surface, a second surface, a third surface, and a fourth surface are provided as the plurality of reflection surfaces of the light-guiding member, the first surface is the first reflection surface, the fourth surface is the second reflection surface, the first surface and the third surface are disposed so as to face each other such that a diopter is approximately 0 for the external light passing through the first surface and the third surface, the fourth surface is adjacent to the first surface and is configured to totally reflect the image light to be incident on the third surface, and the image light totally reflected by the fourth surface is totally reflected by the third surface, totally reflected by the first surface, and totally reflected by the second surface, and subsequently passes through the first surface and reaches an observation side. In this case, favorable light guidance can be achieved in an optical system that guides image light using total reflection.

In another aspect, the second surface is a semi-transparent reflection surface that reflects the image light and transmits the external light. In this case, see-through viewing in the second surface can be ensured.

As described above, a light-guiding member according to a specific aspect includes a plurality of reflection surfaces and configured to guide image light by reflecting the image light at an inner surface. The plurality of reflection surfaces includes a first reflection surface and a second reflection surface adjacent to each other, at least one of the first reflection surface and the second reflection surface including a curved surface. At a boundary between the first reflection surface and the second reflection surface, an end of the first reflection surface and an end of the second reflection surface match when projected from a specific direction.

In the case of the light-guiding member, it is not necessary to provide a mold for the connection surface that connects the first reflection surface and the second reflection surface in the molding. In addition, in this case, a situation where a part of the image light becomes leaked light or ghost light due to the connection surface and the like can be avoided, and thus favorable visibility can be maintained. Further, failure of the hard coat at the boundary between the first reflection surface and the second reflection surface can be suppressed.

What is claimed is:

1. A virtual image display device comprising:
   a display element; and
   a light-guiding member including a plurality of reflection surfaces and configured to guide image light from the display element by reflecting the image light at an inner surface, and cause the image light and external light to be visually recognized in an overlapping manner, wherein
   at a boundary between a first reflection surface and a second reflection surface adjacent to each other included in the plurality of reflection surfaces of the light-guiding member with at least one of the first reflection surface and the second reflection surface including a curved surface, an end of the first reflection surface and an end of the second reflection surface match when projected from a specific direction without a connection portion to connect the first reflection surface and the second reflection surface.

2. The virtual image display device according to claim 1, wherein
   the first reflection surface is a flat surface;
   the second reflection surface is a free curved surface; and
   the specific direction is a normal direction of the first reflection surface.

3. The virtual image display device according to claim 1, wherein a step height in the specific direction at the boundary between the first reflection surface and the second reflection surface is 0.25 mm or smaller.

4. The virtual image display device according to claim 1, wherein the light-guiding member includes a portion where the end of the first reflection surface and the end of the second reflection surface are crossed in a region from a center side to a peripheral side at the boundary between the first reflection surface and the second reflection surface.

5. The virtual image display device according to claim 1, wherein
   the second reflection surface is a light incidence surface through which the image light from the display element enters the light-guiding member; and
   the first reflection surface is a light emission surface through which the image light is emitted from the light-guiding member.

6. The virtual image display device according to claim 1, wherein the first reflection surface and the second reflection surface are surfaces disposed on an observation side among the plurality of reflection surfaces.

7. The virtual image display device according to claim 1, wherein
   a first surface, a second surface, a third surface, and a fourth surface are provided as the plurality of reflection surfaces included in the light-guiding member;
   the first surface is the first reflection surface;
   the fourth surface is the second reflection surface;
   the first surface and the third surface are disposed so as to face each other such that a diopter is approximately 0 for the external light passing through the first surface and the third surface;
   the fourth surface is adjacent to the first surface and is configured to totally reflect the image light to be incident on the third surface; and
   the image light totally reflected by the fourth surface is totally reflected by the third surface, totally reflected by the first surface, and totally reflected by the second surface, and subsequently passes through the first surface and reaches an observation side.

8. The virtual image display device according to claim 7, wherein the second surface is a semi-transparent reflection surface that reflects the image light and transmits the external light.

9. A light-guiding member comprising a plurality of reflection surfaces and configured to guide image light by reflecting the image light at an inner surface, wherein
   at a boundary between a first reflection surface and a second reflection surface adjacent to each other included in the plurality of reflection surfaces with at least one of the first reflection surface and the second reflection surface including a curved surface,
   an end of the first reflection surface and an end of the second reflection surface match when projected from a specific direction without a connection portion to connect the first reflection surface and the second reflection surface.

* * * * *